(No Model.)
A. HARTUNG.
WATCH MAKER'S JEWEL SETTING CUTTER.
No. 451,712. Patented May 5, 1891.
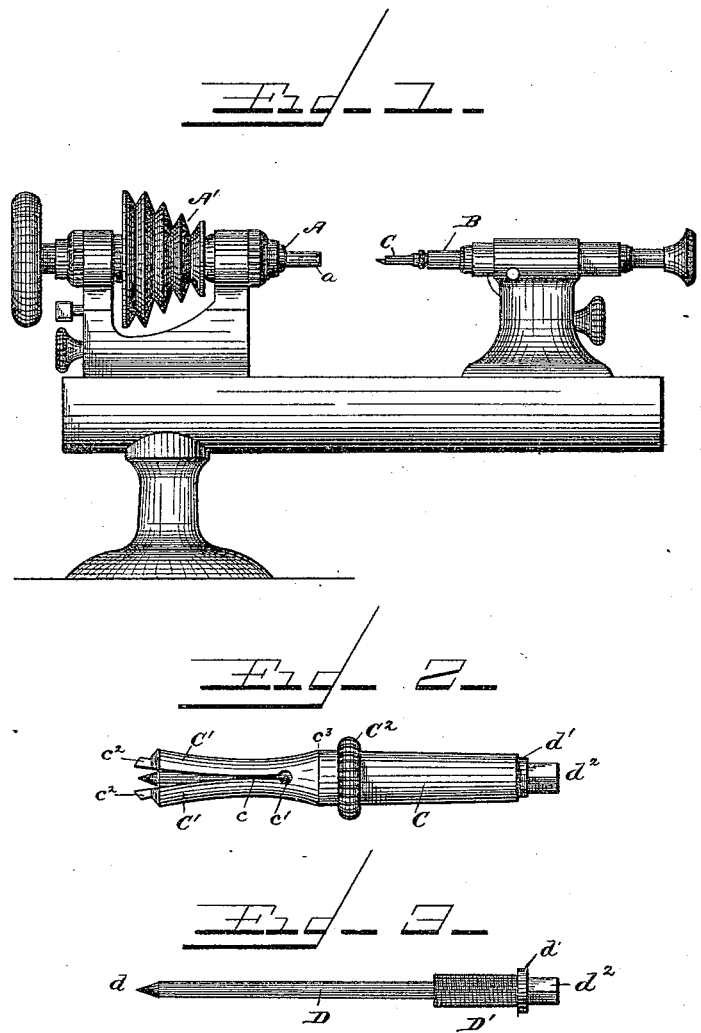
Witnesses:
Lewis Ford
W. H. Ford
Inventor:
Alphonso Hartung,
By A. M. Smith & Son,
Attorneys.

UNITED STATES PATENT OFFICE.

ALPHONSO HARTUNG, OF NEVADA CITY, CALIFORNIA.

WATCH-MAKER'S JEWEL-SETTING CUTTER.

SPECIFICATION forming part of Letters Patent No. 451,712, dated May 5, 1891.

Application filed December 20, 1890. Serial No. 375,349. (No model.)

*To all whom it may concern:*

Be it known that I, ALPHONSO HARTUNG, a citizen of the United States, and a resident of Nevada City, county of Nevada, and State of California, have invented a new and useful Improvement in Jewel-Setting Cutters, of which the following is a full, clear, and exact description, reference being had to the accompanying drawings, making a part of this specification.

My invention relates to the construction of a bit or cutter for use by watch-makers and others in cutting seats for jewels in watches and wherever jewel-setting is required; and it consists in making the bit or cutter in tubular form of steel or other elastic metal properly tempered and bifurcated or split at its cutting end, and in the combination therewith of a center rod adjustable within the longitudinal bore of the bit for adjusting or setting the arms of the latter and the cutters thereon nearer to or farther from each other, according to the diameter of seat required.

It further consists in certain details of construction and arrangement of the parts of the cutter, as hereinafter described and claimed.

In the accompanying drawings, Figure 1 represents in side elevation a watch-maker's lathe with my improved cutter applied. Fig. 2 is a similar view of the bit or cutter detached and enlarged, showing the cutters expanded; and Fig. 3 is a side elevation of the adjusting center rod.

The lathe shown is of a type well known and in common use, and need not therefore be described in detail further than that A indicates a split chuck for receiving the piece $a$ of brass or other metal, in which the jewel is to be set, said chuck being connected with a shaft (shown) provided with a cone-pulley A', for driving it at different speeds, as required, in any usual manner, and B indicates the tail-stock, in which the cutter C is centered and which is adapted to slide in ways on the lathe base-plate for moving the cutter up to and withdrawing it from its work.

The bit or cutter C is shown enlarged in Fig. 2, and is made in tubular or hollow cylindrical form, the bore thereof extending from its shank end to its cutter end, terminating at the latter in cone shape for a purpose which will appear. The cutter end of this bit is bifurcated or split at $c$, the fork terminating, preferably, in a small diametric perforation at $c'$, for giving increased elasticity to the arms C' of the fork and preventing fracture of the metal at the base of the fork. The cutters $c^2$, *per se*, are formed on or applied to the ends of the arms C', which, with the shank, are preferably of steel properly tempered, but which may be made of other suitable elastic metal, if desired. The cutter end of the bit is shown reduced in diameter from a point $c^3$ back of the split therein to said end for giving increased elasticity to the arms C'.

$C^2$ indicates a milled collar on the bit for facilitating its insertion in and removal from the tail-stock of the lathe, and also to hold the body of the cutter while adjusting the center-pin for expanding the cutter-jaws.

The bore in the shank end of the bit is enlarged in diameter and screw-threaded to engage a screw D' on a center pin or rod D, which extends longitudinally through the bit, terminating at its forward end $d$ in a conical point, matching the conical end of the bore in the bit above referred to. The opposite end of the rod at the base or outer end of the screw D' is provided with a collar $d'$, which limits the inward movement of the rod, as shown in Fig. 2, and outside thereof the rod terminates in a squared or polygonal form of shank $d^2$, facilitating the adjustment or screwing in or out of the rod D by means of a key or other suitable device for the purpose.

The operation of the bit or cutter will be readily understood. By screwing the rod D inward the conical point $d$ is crowded through the conical end of the bore in the arms C' and serves to wedge the latter apart until the cutter-points $c^2$ are thrown outward and are the required distance apart to cut a hole or socket of a diameter to snugly incase the jewel to be set. The bit is placed in the tail-stock and the piece of metal $a$, in which a hole smaller than the jewel to be set and indicated in dotted lines in Fig. 2, has been previously drilled, being secured in the chuck of the lathe, the tail-stock or its sliding center is moved forward until the cutters $c^2$ have cut a socket of the required depth in the metal $a$ when the latter is in readiness to receive the jewel. By withdrawing or screwing the rod D outward, owing to the elasticity of the arms C', the latter will close upon each other, bringing the cutter-points together and reducing the cut thereof to a minimum diameter.

Any desired form can of course be given to the cutter-points; but that shown has been found very effective in practice.

By the construction shown a very simple, durable, and effective cutter is secured and one which will be found especially useful in opening the settings for and replacing broken jewels in Swiss or other hand-made watches and for other like purposes.

Having now described my invention, I claim as new and desire to secure by Letters Patent—

1. The cutter-bit having the bifurcated end, the arms of which are elastic and yielding, and provided with the internal screw-threaded bore, in combination with the center rod or spindle for separating said arms, provided with the squared end extension and the enlarged screw-threaded hub engaging the screw-threaded bore of said cutter-bit for effecting the longitudinal adjustment of the spindle, for the purpose substantially as described.

2. A tubular bit for use in watch-makers' lathes, having its end split to form expanding cutters and formed with a diametric perforation at which said split terminates and with an internal screw-thread, in combination with a spindle having a conical end working in said tubular bit and provided with the squared end extension and the enlarged screw-threaded hub engaging the internally-screw-threaded tubular bit for adjusting said spindle, substantially as described.

3. An expansion-bit for use in watch-makers' lathes, said bit being made in two parts, consisting of a tubular and internally-screw-threaded bit or sleeve having a split in one end terminating in a diametric perforation and made tapering at its other end to fit the lathe tail-stock, and also provided with the milled flange $C^2$ for facilitating the insertion and removal of the same, in combination with the spindle D, working in the tubular bit or sleeve, formed in one piece with the conical point $d$, screw-threaded hub D', flange or stop $d'$, and nut $d^2$, substantially as set forth.

In testimony whereof I have hereunto set my hand.

ALPHONSO HARTUNG.

Witnesses.
F. C. LUETJE,
JOHN S. SWARS.